United States Patent
Challener et al.

(10) Patent No.: US 6,968,462 B2
(45) Date of Patent: Nov. 22, 2005

(54) VERIFYING PHYSICAL UNIVERSAL SERIAL BUS KEYSTROKES

(75) Inventors: David Carroll Challener, Raleigh, NC (US); Richard Alan Dayan, Wake Forest, NC (US); Eric Richard Kern, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 955 days.

(21) Appl. No.: 09/734,105

(22) Filed: Dec. 11, 2000

(65) Prior Publication Data

US 2002/0073342 A1 Jun. 13, 2002

(51) Int. Cl.$^7$ .......................... G06F 11/30; G06F 12/14; H04L 9/00; H04L 9/32
(52) U.S. Cl. ....................... 713/200; 713/202
(58) Field of Search ............... 713/200, 202; 710/8, 62–63, 100; 400/472; 709/219

(56) References Cited

U.S. PATENT DOCUMENTS

| | | | | |
|---|---|---|---|---|
| 5,748,888 A | * | 5/1998 | Angelo et al. ............... | 713/200 |
| 5,890,015 A | * | 3/1999 | Garney et al. ................ | 710/62 |
| 5,956,481 A | | 9/1999 | Walsh et al. | |
| 6,016,553 A | | 1/2000 | Schneider et al. | |
| 6,038,320 A | | 3/2000 | Miller | |
| 6,067,589 A | * | 5/2000 | Mamata ....................... | 710/63 |
| 6,216,183 B1 | * | 4/2001 | Rawlins ..................... | 710/100 |
| 6,629,793 B1 | * | 10/2003 | Miller ........................ | 400/472 |
| 2003/0188049 A1 | * | 10/2003 | Dickens ........................ | 710/8 |
| 2003/0217123 A1 | * | 11/2003 | Anderson et al. ........... | 709/219 |

* cited by examiner

*Primary Examiner*—Guy LaMarre
*Assistant Examiner*—A. Sherkat

(57) ABSTRACT

A method and system for securing access to a keyboard driver in a host computer. The host computer includes a host processor that manages communication between a keyboard driver and a keyboard attached to the host computer. In accordance with a method of the present invention, a packet is received on a bus that connects the keyboard to the host processor. A determining is made of whether or not the packet originated from the keyboard. In response to determining that the packet originated from the keyboard, a independent bus traffic monitor processor sets an input secure bit which is then read by the host processor to selectively provide access to the keyboard driver in accordance with verification that the keyboard originated the packet.

19 Claims, 5 Drawing Sheets

VERIFYING PHYSICAL UNIVERSAL SERIAL BUS KEYSTROKES

CROSS REFERENCE TO RELATED APPLICATIONS

The present application is related to the following copending U.S. patent application: U.S. patent application Ser. No. 09/455,104 filed on Dec. 6, 1999, titled "METHOD AND SYSTEM FOR SECURING A PERSONAL COMPUTER BUS." The above mentioned patent application is assigned to the assignee of the present invention. The content of the cross referenced copending application is incorporated herein by reference.

BACKGROUND OF THE INVENTION

1. Technical Field

The present invention relates in general to neutralizing unauthorized access to a user input interface in a data processing system, and in particular to distinguishing between physical keystroke input and software keystroke emulation. More particularly, the present invention relates to identifying a physically generated keyboard keystroke within a universal serial bus (USB) host controller and providing selective access to a keyboard driver in response thereto such that system access by emulated keystrokes may be restricted.

2. Description of the Related Art

Computer security is becoming increasingly important in today's heavily networked computer systems. Protecting information contained in data files within such systems is a non-trivial and costly undertaking. As intra-networking and inter-networking technologies continue to rapidly advance, providing system security for personal computers is an important goal.

The components of a personal computer are assembled into an enclosure that includes a variety of data ports or external connectors to couple input and output devices to the system processor. In addition to such dedicated ports for connecting input devices such as a keyboard or a mouse, a personal computer system may also include a variety of general purpose busses for interfacing a wide variety of peripheral devices through industry standard interfaces.

One such type of interface is the Universal Serial Bus (USB) interface, the specification of which is set forth in a generally available document entitled "Universal Serial Bus Specification" Release 1.1, Sep. 23, 1998, (USB.ORG), prepared by representatives of the Compaq, Intel, Microsoft, and NEC corporations. Peripheral device interfaces that comply with this standard are referred to as USB interfaces and have been included in many recently developed personal computer systems. On such personal computer systems, USB interfaces serve to provide well-known plug and play capability for personal computer peripherals such as telephones, CD-ROM drives, joysticks, tape and floppy drives, scanners, and printers. Additionally, the USB interface allows an alternate connection for primary system input devices such as keyboards and mice, providing an alternative to the dedicated keyboard and mouse ports that many personal computer manufacturers provide.

Personal computers have always been vulnerable to acquiring internal system problems that are introduced by outside sources, such as when a virus is introduced into the system via a floppy disk. As avenues for data processing networking increase via internetworking, Local Area Networking, etc., personal computers are becoming even less isolated and more susceptible to externally introduced corruption. One type of such corruption faced by personal computer system users is commandeering of system input interfaces by an unauthorized source. This situation arises, for example, when software instructions are utilized to emulate keyboard keystrokes and thus assume control of the host keyboard driver application.

From the foregoing, it can be appreciated that a need exists for a system and method for verifying that a keyboard control instruction originated as a physical keystroke rather than as a software emulated keystroke.

SUMMARY OF THE INVENTION

A method and system for securing access to a keyboard driver in a host computer are disclosed herein. The host computer includes a host processor that manages communication between a keyboard driver and a keyboard attached to the host computer. In accordance with a method of the present invention, a packet is received on a bus that connects the keyboard to the host processor. A determination is made whether or not the packet originated from the keyboard. In response to a determination that the packet originated from the keyboard, a independent bus traffic monitor processor sets an input secure bit that is then read by the host processor to selectively provide access to the keyboard driver in accordance with verification that the keyboard originated the packet.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

Figure 1:
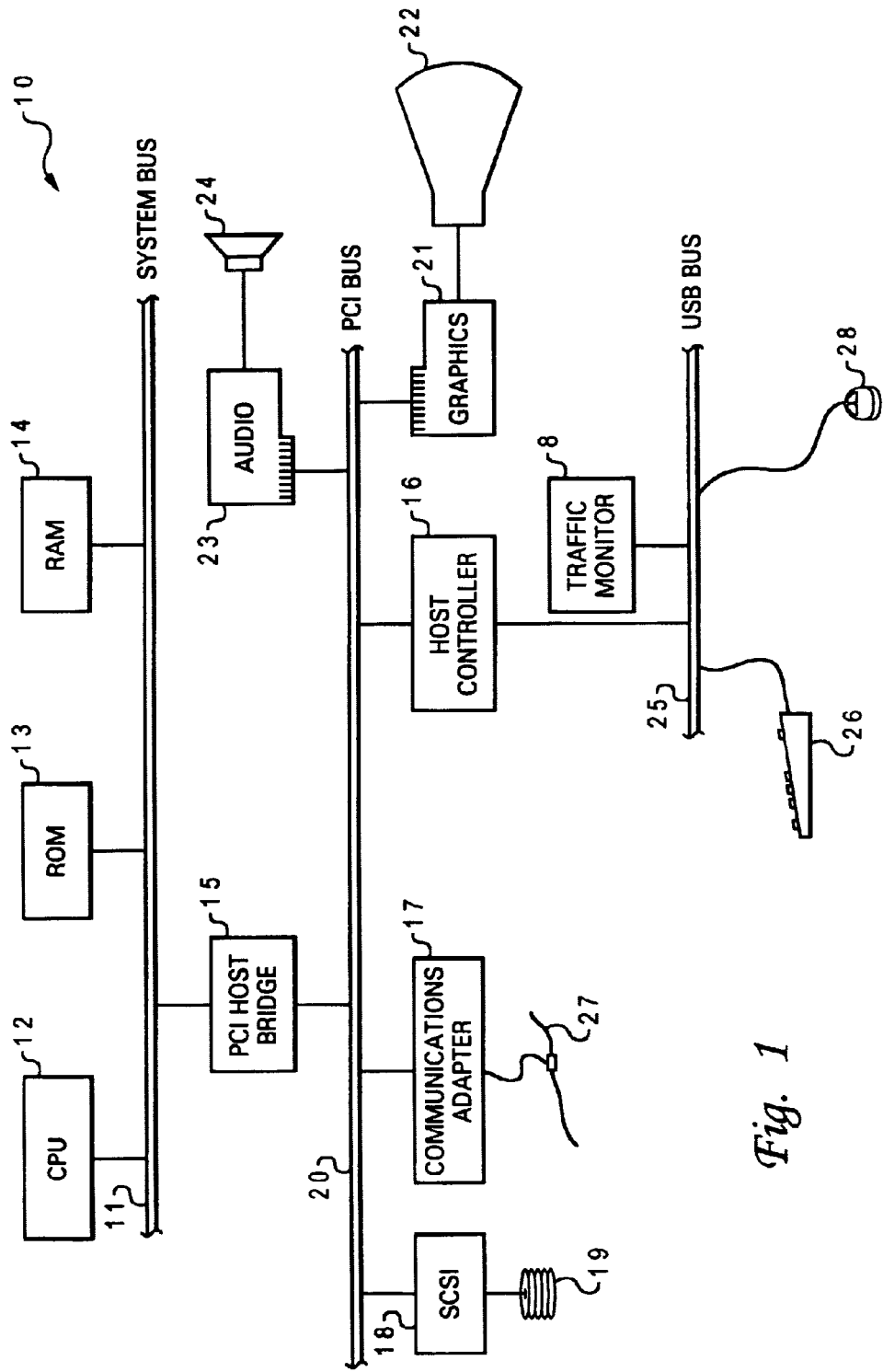
FIG. 1 is a block diagram of a personal computer system in which a preferred embodiment of the present invention is applicable.

Referring now to the drawings wherein like reference numerals refer to like and corresponding parts throughout, and in particular to FIG. 1, there is depicted a block diagram of a personal computer system in which a preferred embodiment of the present invention is applicable. As shown, a central processing unit (CPU) 12, a read-only memory (ROM) 13, and a Random Access Memory (RAM) 14 are connected to a system bus 11 of a personal computer system 10. CPU 12, ROM 13, and RAM 14 are also coupled to a PCI bus 20 of personal computer system 10 through a PCI host bridge 15. PCI host bridge 15 provides a low latency path through which CPU 12 may directly access PCI devices mapped anywhere within bus memory and/or I/O address spaces. PCI host bridge 15 also provides a high bandwidth path allowing PCI devices to directly access RAM 14.

Also attached to PCI bus 16 is a communications adapter 17 and a small computer system interface (SCSI) 18. Communications adapter 17 connects personal computer system 10 to a local-area network (LAN) 27. SCSI 18 is utilized to control a high-speed SCSI disk drive 19. In addition, an audio adapter 23 and a graphics adapter 21 may be attached to PCI bus 20. Graphics adapter 21 controls visual output through a video monitor 22 and audio adapter 23 controls audio output through a speaker 24.

A Universal Serial Bus (USB) host controller 16 may be utilized for coupling a USB bus 25 to PCI bus 16. As shown, a keyboard 26 and a mouse 28 may be attached to USB bus 25 for performing certain basic I/O functions. USB 25 is a cable bus that supports data exchange between the host processing system (embodied by CPU 12, ROM 13, and RAM 14 on system bus 11) and various simultaneously accessible peripherals. The attached peripherals, such as keyboard 26 and mouse 28 share USB bandwidth through a host-scheduled, token-based protocol as specified in the USB 1.1 specification, the relevant subject matter of which is incorporated herein by reference.

As further depicted in FIG. 1, a USB keyboard traffic monitor 8 is connected to USB 25 in accordance with a preferred embodiment of the present invention. As explained in further detail hereinbelow, USB keyboard traffic monitor 8 serves to "listen" to traffic on USB 25 to determine when keyboard 26 delivers a USB packet in response to user input in the form of a keystroke. Upon detecting a keyboard originated packet on USB 25, a host system independent processor associated with traffic monitor 8 sets an "input secure bit" indicating to the host system that the instruction derived from the keystroke was physically generated.

Figure 2:
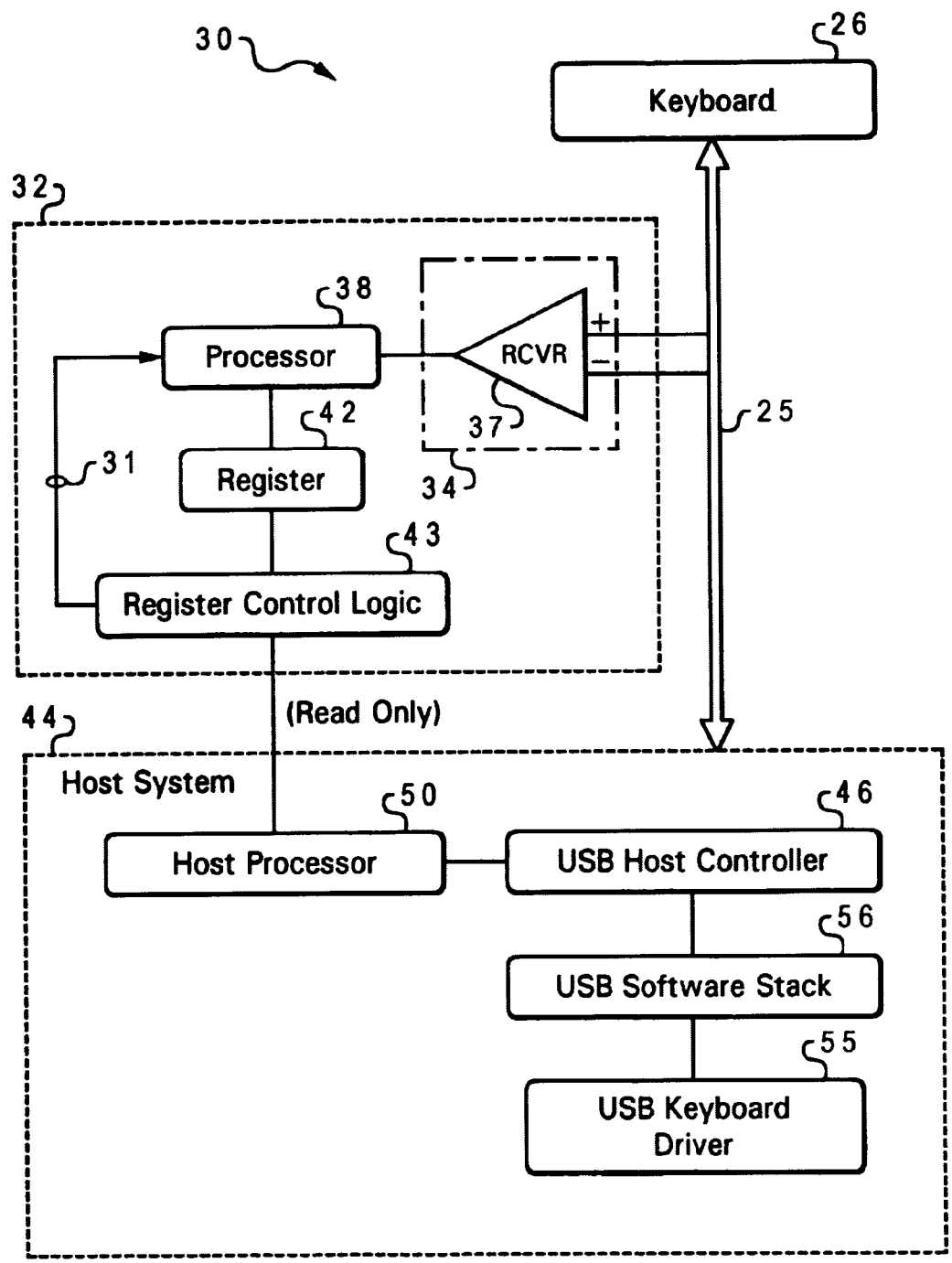
FIG. 2 illustrates a user input subsystem in accordance with a preferred embodiment of the present invention.

With reference now to FIG. 2, there is illustrated a user input subsystem 30 in accordance with a preferred embodiment of the present invention. As shown in FIG. 2, user input subsystem 30 includes a host system 44 corresponding to CPU 12, ROM 13, and RAM 14 in FIG. 1. The USB interface to host system 44 is embodied by a host controller 46. Host controller 46 and its associated host controller driver (HCD) (depicted as HCD 48 in FIG. 3) may be implemented as a combination of hardware, firmware, or software.

USB 25 is a polled bus with host controller 46 initiating all data transfers. Each such transaction begins when host controller 46, on a scheduled basis, delivers a USB packet describing the type and direction of the transaction and the USB device address. This packet is referred to as a "token packet." The USB device that is addressed selects itself by decoding the appropriate address fields. The embodiment depicted in FIG. 2 illustrates keyboard 26 as the sole device connected to USB 25. A USB device, such as keyboard 26, is sometimes referred to as a "function" in the context of standard USB terminology.

When establishing a USB connection for an attached device such as keyboard 26, host system 44 assigns a unique USB address to the attached device. Bus enumeration is the activity that identifies and assigns unique addresses to devices attached to USB 25. Because the USB system allows USB devices to attach or detach from USB 25 at any time, bus enumeration is an on-going task handled by USB system software within host system 44. Keyboard 26 is accessed by the USB address that is assigned when keyboard 26 is attached and enumerated.

USB 25 serves as the physical medium over which keyboard 26 transmits data to host system 44. Within host system 44, a host processor 50 communicates with keyboard 26 through host controller 46. Regarding data transfer to and from keyboard 26, host system 44 is responsible for the following: detecting the attachment and removal of USB devices, managing control flow between host processor 50 and keyboard 26, managing data flow between host processor 50 and keyboard 26, collecting status and activity statistics, and providing power to keyboard 26.

The actual transmission of data across the physical USB 25 takes place as a serial bit stream. To accommodate such serial bus transmission, host controller 46 includes a serial interface engine that may be implemented as part of the host or a USB device for serializing/deserializing data to or from USB 25. For data transmitted from host system 44 to USB 25, host controller 46 converts protocol and data information from its native format to a bit stream transmitted on USB 25. For data received from keyboard 26, host controller 46 deserializes the incoming bit stream. Within host system 44, the serial interface engine is part of host controller 46.

Host controller 46 is responsible for receiving data from a USB subsystem (depicted as client applications 33 and USB driver 53 in FIG. 3) and sending this data to USB 25. Conversely, host controller 46 receives data from USB 25 and sends it to the USB subsystem within host system 44. When a keystroke is entered on keyboard 26, a corresponding scan matrix signal (from an internal keyboard ASIC) is delivered to a keyboard controller (not depicted) wherein it is serialized and transmitted by a differential output driver (not depicted) and forwarded to USB host controller 46 as a serialized data packet conforming to the serial data transfer protocol utilized on USB 25.

The incoming data packet is deserialized and processed by host controller 46 such that the data is received by a USB keyboard driver 55 through a USB software stack 56. As described in further detail with reference to FIG. 3, keyboard driver 55 translates the data from keyboard 26 such that host software applications can respond properly to the given keystroke command.

In accordance with a preferred embodiment of the present invention, user input subsystem 30 further includes a keystroke traffic monitor 32 that serves to verify that a code within keyboard driver 55 resulted from a physical keystroke from keyboard 26. Keystroke traffic monitor 32 includes a processor 38 that operates independently of the operating system within host system 44 to scan traffic on USB 25 and determine when a packet originates from keyboard 26.

In accordance with a preferred embodiment, keystroke traffic monitor 32 includes an input USB port 34 connected to USB 25. A differential input receiver 37 within input port 34 accepts data packets from USB 25 during system operations. Processor 38 deserializes and processes the incoming packets to identify a keyboard-originated packet. As described in further detail with reference to FIG. 4, processor 38 reads the USB device address encoded within the packets in order to identify a keyboard packet.

Upon detection of a keyboard-originated packet, processor 38 sets an input secure bit within a dedicated register 42. The input secure bit serves to notify host system 44 of whether or not the keyboard-originated data originated as a physical keystroke. To prevent unauthorized software-emulated "keystrokes" from surreptitiously accessing host system resources, keyboard driver 55, supported by the host system's operating system, reads the input secure bit prior to processing a given keyboard command. If the input secure bit is set, the coding was set by a physical keystroke. If the input secure bit is not set, the data is suspect.

To maintain independent security between keystroke traffic monitor 32 and host system 44, a register control logic 43 permits only data read operations from host processor 50 to dedicated register 42.

Figure 3:
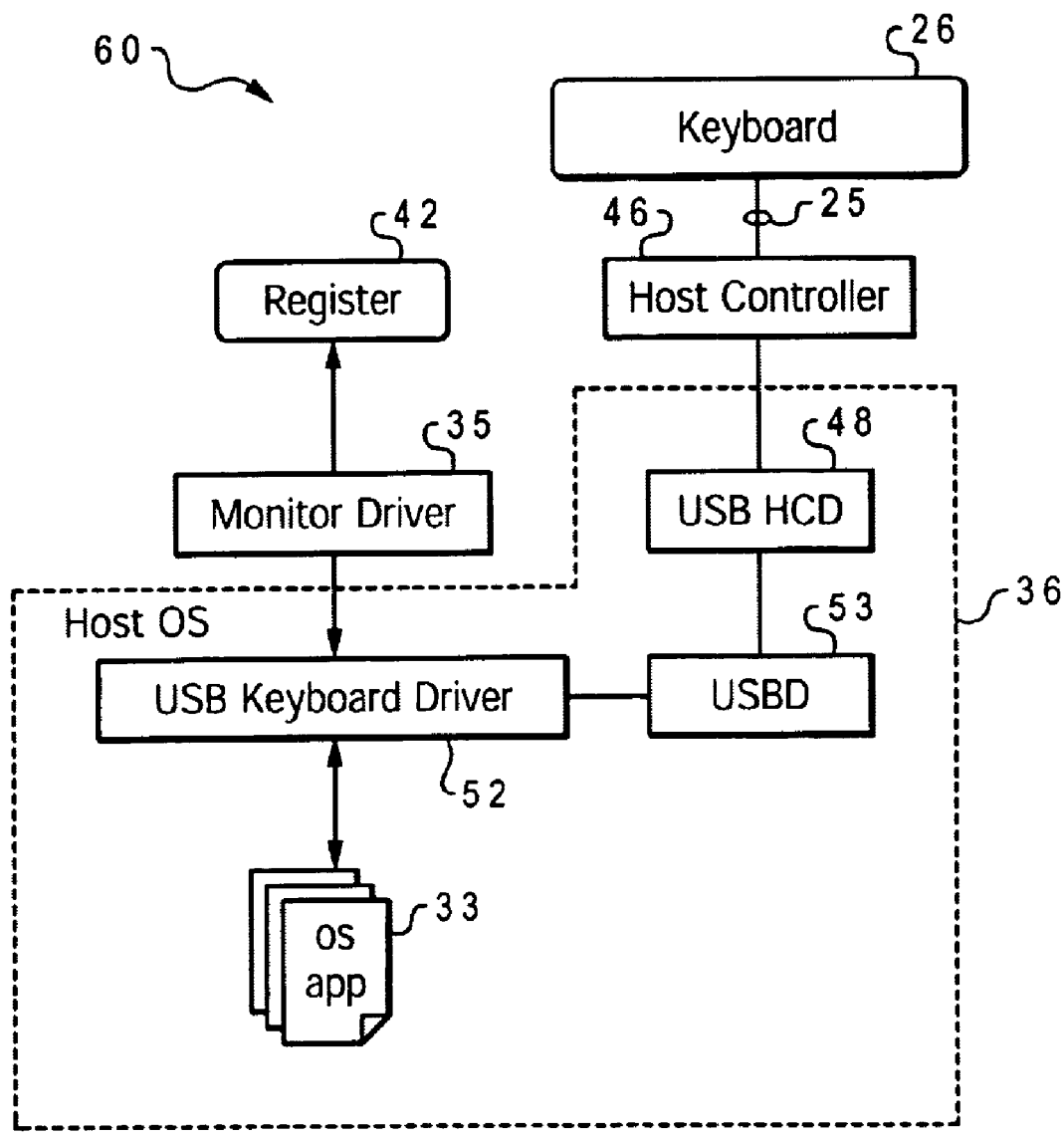
FIG. 3 depicts a keyboard input software stack applicable in the keystroke verification system of FIG. 2.

Turning now to FIG. 3, there is depicted a keyboard input software stack 60 applicable in the keystroke verification system of FIG. 2. As shown in FIG. 3, software stack 60 includes a monitor driver 35 that provides the instructions for enabling the traffic scanning and keyboard packet detection within processor 38.

A host operating system 36 for host system 44 includes a USB host controller driver (HCD) 48 that serves to more easily map the various host controller implementations into the USB system, such that an operating system application 33 can interact with its device (keyboard 26). HCD 48 serves as the software interface between host controller 46 and a USB software driver (USBD) 53 in allowing USB keyboard 26 to be attached to the host. USB driver 53 is responsible for performing the bus enumeration procedure for attaching keyboard 26 to USB 25 as described above.

USBD 53 provides the basic host interface for operating system applications to USB devices. HCD 48 and USBD 53 present software interfaces at different levels of abstraction. They must, however, operate together in a specified manner to satisfy the overall requirement of the USB system. HCD 48 provides an abstraction of host controller 46 and an abstraction of the host controller's view of data transfer across USB 25. USBD 53 provides an abstraction of the USB device (keyboard 26) and of the data transfers between a client of USBD 53 (such as a device driver 52 or operating system applications 33) and the USB device.

Figure 4:
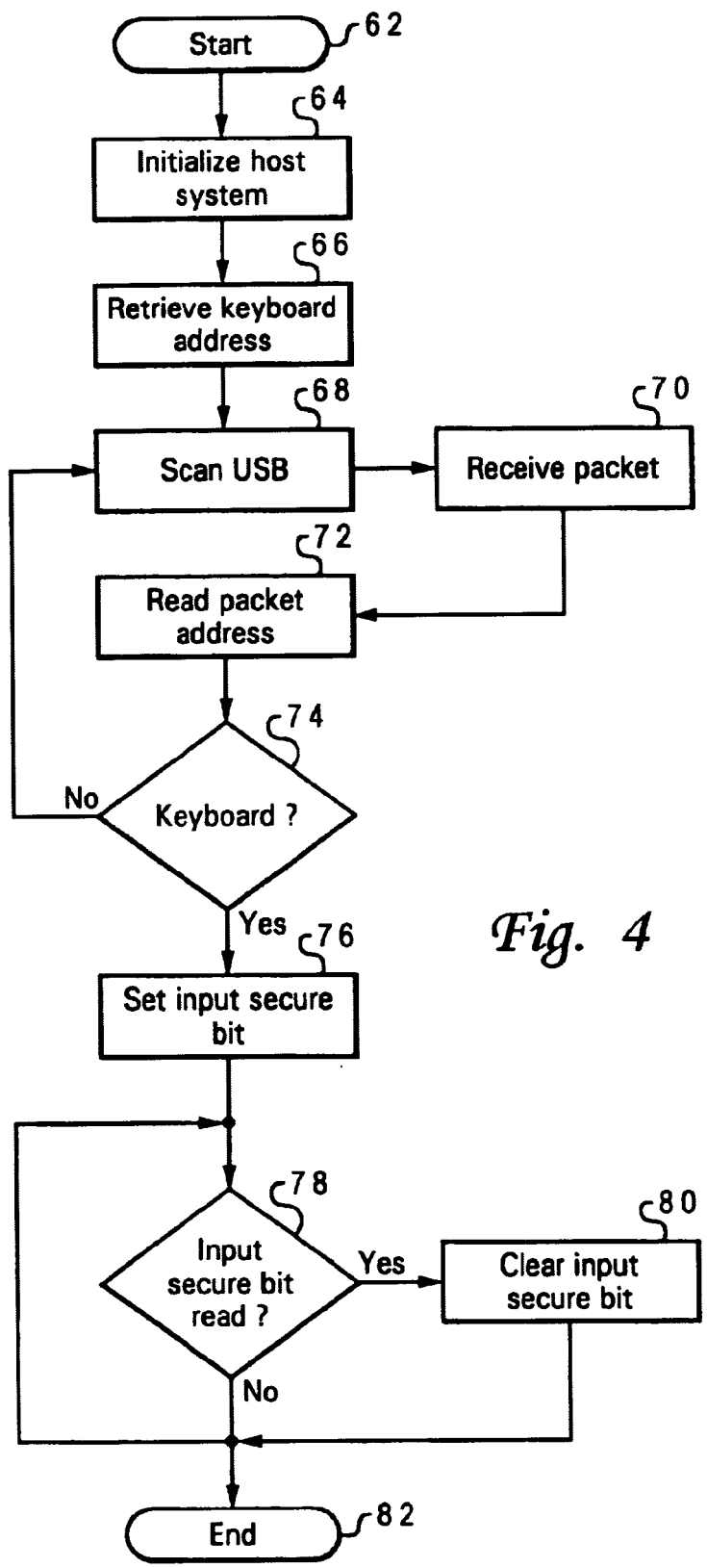
FIG. 4 is a flow diagram depicting steps performed by the user input subsystem of FIG. 2 in accordance with a preferred embodiment of the present invention.

With reference now to FIG. 4, there is illustrated a flow diagram depicting a keystroke verification technique implemented by the user input subsystem of FIG. 2 in accordance with a preferred embodiment of the present invention. The keystroke verification technique commences at step 62 and proceeds to step 64 wherein the host system is initialized. During a USB bus enumeration procedure accompanying system startup the host system assigns a USB address to keyboard 26. It should be noted that in accordance with standard USB bus enumeration procedure as described with reference to FIG. 2, such address assignment is performed any time a USB device is attached during system operation.

Proceeding to step 66, keystroke traffic monitor 32 retrieves the USB address assigned to keyboard 26. Processor 38 stores this address in memory. After the address has been obtained, keystroke traffic monitor 32 begins scanning USB 25 as depicted at step 68. Upon receipt of a packet (step 70), processor 38 reads the packet address (step 72) to determine whether or not the address matches the address assigned to keyboard 26.

If as shown at steps 74 and 68, the address does not match the keyboard USB address, keystroke traffic monitor 32 continues scanning USB 25 without further response to the packet. If, however, the packet address matches the keyboard address, processor 38 performs a write operation to set the input secure bit within dedicated register 42 as illustrated at step 76.

The keystroke verification technique continues as depicted at step 78 with a determination by processor 38 of whether or not the input secure bit has been read by one of operating system applications 56. As illustrated in FIG. 2 a read indicator input 31 from register control logic 43 provides processor 38 with an indicator when a read is performed with respect to dedicated register 42. An indication from read indicator 38 that the input secure bit has not been read is interpreted by processor 38 as meaning that the instruction associated with the keystroke has not yet been executed. Processor 38 waits until the input secure bit has been read before clearing the input secure bit with another write operation to dedicated register 42 (step 80).

Figure 5:
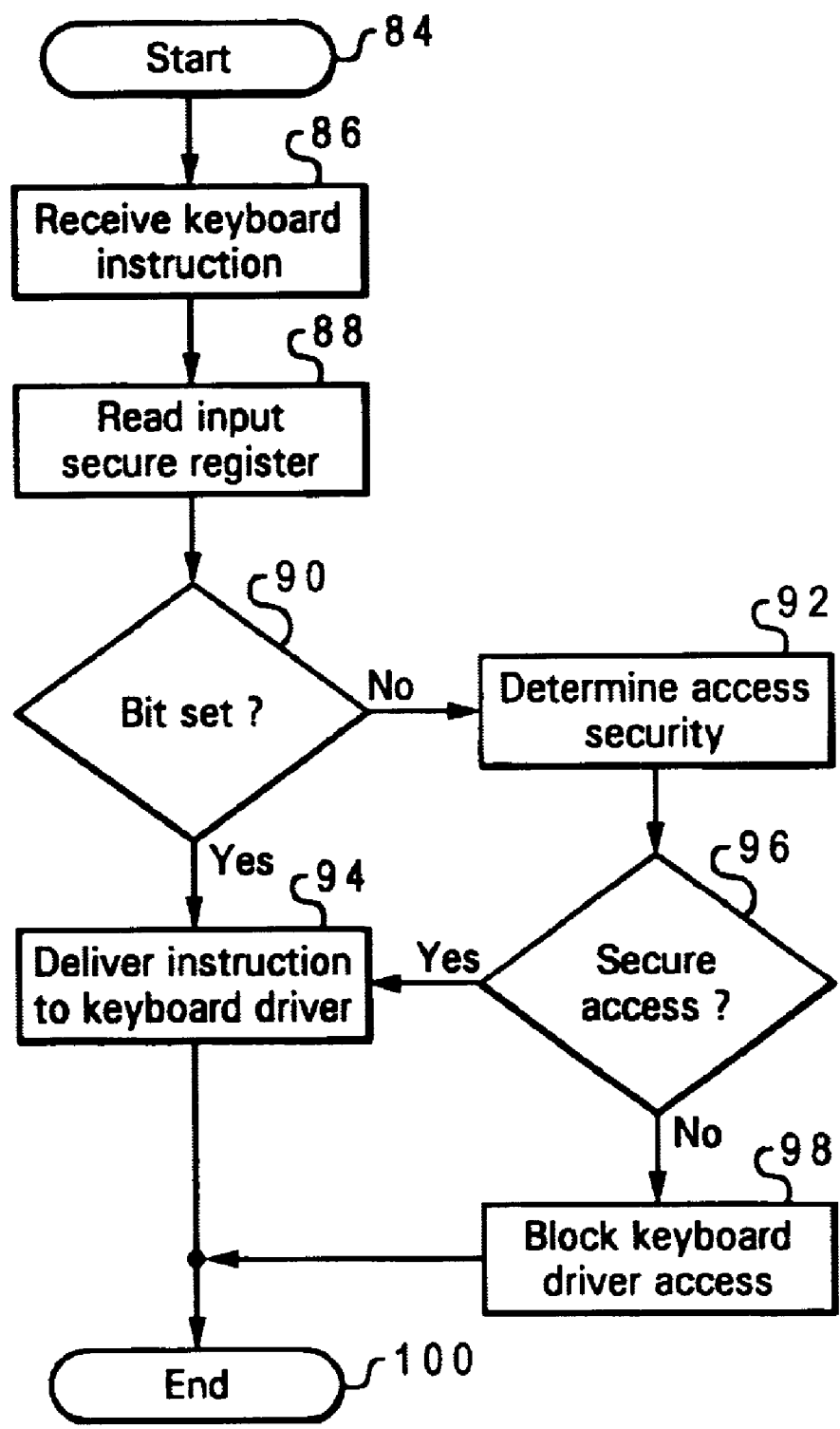
FIG. 5 is a flow diagram illustrating steps performed for providing selective access to a keyboard driver in accordance with a preferred embodiment of the present invention.

Turning now to FIG. 5, there is depicted a flow diagram illustrating steps performed for providing selective access to a keyboard driver in accordance with a preferred embodiment of the present invention. The selective access procedure begins at steps 84 and 86 which depicted receipt of an instruction from keyboard 26 within host system 44. Next as shown at step 88, the input secure register bit is read by operating system applications 56 to determine whether or not the keyboard instruction resulted from a physical keystroke.

As depicted at steps 90 and 94, if the input secure bit is set, host processor 50 delivers the keyboard instruction to keyboard driver 52. The instruction is then available for operating system applications 56 and the process ends at step 100 with respect to this particular instruction. If, however, the input secure bit is not set, host system 44 performs an alternate access security procedure as shown at step 92. If, as illustrated at steps 96 and 94 the alternate security verification is successful, the instruction is forwarded to keyboard driver 52. Otherwise, as shown at step 98 access to keyboard driver 52 is blocked.

While the invention has been particularly shown and described with reference to a preferred embodiment, it will be understood by those skilled in the art that various changes in form and detail may be made therein without departing from the spirit and scope of the invention.

What is claimed is:

1. A method for securing access to a keyboard driver in a host computer, wherein said host computer includes a host processor that manages communication between said keyboard driver and a keyboard attached to said host computer, said method comprising:

receiving a packet on a bus that provides a communication medium between said keyboard and said host computer; and setting an input secure bit only in response to determining that said packet originated from said keyboard, wherein said set input secure bit is subsequently utilized to access said keyboard driver from said host processor.

2. The method of claim 1, further comprising reading said input secure bit to determine whether or not said keyboard driver may be accessed by said host processor.

3. The method of claim 1, further comprising:

detecting if said input secure bit has been read; and in response to detecting that said input secure bit has been read, clearing said input secure bit.

4. The method of claim 1, further comprising scanning packets on said bus during operation of said host processor.

5. The method of claim 1, wherein said keyboard includes a keyboard controller for receiving and responding to keystrokes from said keyboard, and wherein said method further comprises determining whether said packet originated from said keyboard controller.

6. The method of claim 1, further comprising determining a device address of said keyboard upon initialization of said keyboard with respect to said host computer.

7. The method of claim 6, wherein said step of determining a device address further comprises:

reading an address field of said data packet;

determining whether or not said address field matches said keyboard device address; and in response to determining that said address field matches said keyboard device address, setting said input secure bit.

8. The method of claim 6, wherein said bus is a Universal Serial Bus (USB) such that said keyboard is identified by a USB device address, said step of determining a device address further comprising reading a USB address field of said packet.

9. The method of claim 8, further comprising assigning a unique USB address to said keyboard.

10. A system for securing access to a keyboard driver in a host computer, wherein said host computer includes a host processor that manages communication between said keyboard driver and a keyboard attached to said host computer, said system comprising:

processing means for receiving a packet on a bus that connects said keyboard to said host processor;

processing means for determining whether said packet originated from said keyboard; and processing means responsive to determining that said packet originated from said keyboard for setting an input secure bit that is read by said host processor to selectively provide access to said keyboard driver in accordance with verification that said keyboard originated said packet.

11. The system of claim 10, further comprising:

processing means for detecting if said input secure bit has been read; and processing means responsive to detecting that said input secure bit has been read for clearing said input secure bit.

12. The system of claim 10, further comprising processing means for scanning packets on said bus during operation of said host processor.

13. The system of claim 10, wherein said keyboard includes a keyboard controller for receiving and responding to keystrokes from said keyboard, and wherein said system further comprises processing means for determining whether said packet originated from said keyboard controller.

14. The system of claim 10, further comprising processing means for determining a device address of said keyboard upon initialization of said keyboard with respect to said host computer.

15. The system of claim 14 further comprising:

processing means for reading an address field of said data packet;

processing means for determining whether or not said address field matches said keyboard device address; and processing means responsive to determining that said address field matches said keyboard device address for setting said input secure bit.

16. The system of claim 14, wherein said bus is a Universal Serial Bus (USB) such that said keyboard is identified by a USB device address, said system further comprising processing means for reading a USB address field of said packet.

17. The system of claim 16, further comprising processing means for of assigning a unique USB address to said keyboard.

18. A system for securing access to a keyboard driver in a host computer, wherein said host computer includes a host processor that manages communication between said keyboard driver and a keyboard, said system comprising:

a processor for analyzing traffic on a bus that connects said keyboard to said host computer, wherein said processor identifies packets that originate from said keyboard; and an input secure bit that is set in response to said processor identifying a packet originating from said keyboard, wherein said input secure bit is utilized by said host processor to provide selective access to said keyboard driver.

19. The system of claim 18, wherein said host computer is a Universal Serial Bus (USB) host that includes a USB host controller, and wherein said bus is a USB that provides USB connectivity between said keyboard and said host processor such that packets transferred on said USB conform to USB transfer protocol.

\* \* \* \* \*